(12) United States Patent
Wilbrod

(10) Patent No.: US 8,125,350 B2
(45) Date of Patent: Feb. 28, 2012

(54) METHOD AND DEVICE FOR THE MULTI-TECHNOLOGY DETECTION OF VEHICLES

(75) Inventor: Jean-Hubert Wilbrod, Saint-Maur-des-Fosses (FR)

(73) Assignee: Neavia Technologies, Creteil (FR)

( * ) Notice: Subject to any disclaimer, the term of this patent is extended or adjusted under 35 U.S.C. 154(b) by 316 days.

(21) Appl. No.: 12/394,830

(22) Filed: Feb. 27, 2009

(65) Prior Publication Data

US 2009/0219172 A1 Sep. 3, 2009

(30) Foreign Application Priority Data

Feb. 28, 2008 (FR) ...................................... 08 51279

(51) Int. Cl.
*G08G 1/01* (2006.01)
(52) U.S. Cl. ......... 340/933; 340/934; 340/937; 340/938
(58) Field of Classification Search .................. 340/933, 340/934, 935, 936, 937, 938, 943, 988; 701/300, 701/301
See application file for complete search history.

(56) References Cited

U.S. PATENT DOCUMENTS

| | | | | |
|---|---|---|---|---|
| 5,663,720 | A * | 9/1997 | Weissman ...................... | 340/934 |
| 5,798,983 | A * | 8/1998 | Kuhn et al. ..................... | 367/135 |
| 7,541,943 | B2 * | 6/2009 | Manor ............................ | 340/937 |
| 2005/0203697 | A1 * | 9/2005 | Dalgleish ...................... | 701/117 |

FOREIGN PATENT DOCUMENTS

| | | |
|---|---|---|
| DE | 29709286 | 7/1997 |
| DE | 19729915 | 8/1998 |

* cited by examiner

*Primary Examiner* — Toan N Pham
(74) *Attorney, Agent, or Firm* — Advantedge Law Group

(57) ABSTRACT

Method of detecting vehicles on at least one stretch of a carriageway implementing at least two types of detection chosen from:
  a video detection comprising a step of acquiring and processing the video images of at least one zone, termed the video monitoring zone, of the stretch of carriageway;
  an acoustic detection comprising a step of acquiring and processing the sound originating from at least one zone, termed the acoustic monitoring zone, of the stretch of carriageway;
  a radar detection comprising a step of emitting a microwave electromagnetic radiation towards at least one zone, termed the radar monitoring zone, of the stretch of carriageway and a step of acquiring and processing the microwave electromagnetic radiation reflected,
and comprising at least one step of processing the results of the optical and/or sound and/or radar detections so as to deliver an item of information regarding the presence or absence of at least one vehicle.

30 Claims, 2 Drawing Sheets

METHOD AND DEVICE FOR THE MULTI-TECHNOLOGY DETECTION OF VEHICLES

The present invention relates to the technical field of the detection of vehicles on a carriageway so as, for example but not exclusively, to detect the traffic conditions thereof.

For this purpose, it has been proposed that a measurement of the sound level at the road verge be carried out so as, in particular, to determine the intensity of the traffic, as is described for example in applications FR 2 675 610, WO 2005/073736 or FR 2 812 402. However, the information delivered by the analysis of the sound regime does not always allow the nature of the traffic to be precisely quantified and proves to be sensitive to external disturbances, especially originating from non-monitored carriageways.

In order to obtain more precise information, it is known to resort to a video monitoring involving processing of images making it possible to carry out a count, as well as optionally an evaluation of the speed of movement of the vehicles, or an incident detection, such as is described for example in applications EP 0 396 432 or EP 588 815 or EP 1 710 767.

It has also been envisaged that the monitoring of the various carriageways of a stretch of road be ensured by means of microwave-based radar systems, also called Doppler radar, as is described for example in applications GB 2 389 947 and GB 2 425 010 or US 2007/0257819.

Though these various technologies are individually satisfactory for monitoring and evaluating the nature and regularity of the traffic on the monitored carriageway, they nevertheless exhibit the drawback of being sensitive, depending on the detection types used, to the atmospheric conditions, to the traffic on the opposite carriageways or else to the presence in the detection fields of mobile decoys liable to be identified, wrongly, as vehicles in motion even though, for example, no vehicle is present on the carriageway in the traffic flow direction monitored. Thus, the monitoring devices alluded to above have an error rate of the order of one percent. Though such defects are not always crippling in regard to traffic quantification, they may become particularly detrimental when the monitoring devices are intended to emit alert messages to police forces in order to prevent accidents, as is the case for example with regard to the detection of vehicles travelling in the wrong direction on motorway carriageways, in particular. Specifically, when detecting such events, it is absolutely necessary to have very low error rates, of the order of one in a million, so that users have confidence in the system and react in an appropriate manner to each alert.

In order to achieve such an objective and to offer more reliable monitoring methods and systems than those of the prior art, the invention proposes a method of detecting vehicles on at least one stretch of a carriageway implementing and at least:
- an acoustic detection comprising a step of acquiring and processing the sound originating from at least one zone, termed the acoustic monitoring zone, of the stretch of carriageway;

one detection chosen from:
- a video detection comprising a step of acquiring and processing the video images of at least one zone, termed the video monitoring zone, of the stretch of carriageway;
- a radar detection comprising a step of emitting a microwave electromagnetic radiation towards at least one zone, termed the radar monitoring zone, of the stretch of carriageway and a step of acquiring and processing the microwave electromagnetic radiation reflected, and comprising at least:
- one step of automatically processing the results of the optical and/or sound and/or radar detections so as to deliver an item of information regarding the presence or absence of at least one vehicle.

The implementation of two distinct types of detection to ensure the evaluation of the traffic on the monitored stretch of the carriageway makes it possible to benefit from a certain redundancy of information by using detections which are not sensitive to the same types of decoy and thus makes it possible to substantially reduce the false-alert rates. Specifically, a video detection may be sensitive to the visibility conditions related to atmospheric factors, such as fog or rainstorms, whereas a radar-based detection will not be sensitive to visibility conditions but may be affected by the movement, in proximity to the radar monitoring zone but outside the latter, of bulky objects liable to generate a radar echo. Likewise, the radar detection may be sensitive to the passage of birds through the radar emission and reception lobe, whereas the acoustic detection will not be sensitive to such types of disturbances and will be affected only by the level of the background noise. Thus, the comparison step of the method according to the invention makes it possible to avoid false alerts by eliminating the cases where there is no agreement between the results of the two detections.

According to a characteristic of the invention, the method of detection implements the three types of detection. Such a combination of the three types of detection permits the results to be made more reliable in so far as the detections are not sensitive to the same type of decoy or disturbance.

According to another characteristic of the invention, the step of automatic processing of the results then comprises a comparison of the results so as to conclude on the presence or absence of a vehicle in the case of agreement of the results of at least two of the three types of detection.

The continuous use of three distinct types of detection, followed by the comparison of the result of the three types so as to conclude that a given event has occurred, such as for example the presence or absence of a vehicle, that in the case of agreement of two at least of the results of the three types makes it possible to further reduce the risks of false alerts or erroneous results. Moreover, this makes it possible, should one of the three types of detection be unavailable, to continue to be able to implement the method and hence not to prevent monitoring even though its robustness may possibly decrease.

According to another characteristic of the invention, and still in the case of the simultaneous implementation of the three types of monitoring, the step of automatically processing the results concludes on the presence of the vehicle in the case of agreement of the results of the three types of detection.

The necessity imposed by this characteristic of agreement of the results of the three types of detection makes it possible to yet further reduce, or even to cancel out the detection errors, which can be essential when the method is aimed at detecting the occurrence of a serious incident, such as the detection of vehicles travelling in the wrong direction.

According to a characteristic of the invention, at least one of the acoustic, radar or video monitoring zones is distinct from at least one other monitoring zone. This characteristic of the invention makes it possible, through the spatial decorrelation of two monitoring zones at least, to further reduce the sensitivity of the method according to the invention to decoys or external disturbances.

Of course, it would also be possible to envisage that the video, acoustic and radar monitoring zones are mutually distinct, or else that one of the acoustic, radar or video monitoring zones is distinct from the other two monitoring zones which may, moreover, overlap. Within the meaning of the invention, the monitoring zones are considered to be distinct when they exhibit no common area.

Furthermore, when the detection zones are dissociated or distinct, the comparison, between the result of one of the detections with the result of another detection, is performed on the basis of a time offset determined as a function of the speed, optionally of the direction of the movement of the vehicle and of the distance between the monitoring zones for the detections whose results are compared.

According to the invention, each of the detections may be performed at an identical frequency or, on the contrary, at distinct frequencies.

Thus, according to a characteristic of the invention, the video detection performs the acquisition and processing steps at a sufficient frequency $f_v$ to allow at least two acquisitions of a vehicle travelling in the video monitoring zone at a given reference speed Vr.

According to another characteristic of the invention, the radar detection performs the emission, acquisition and processing steps at a sufficient frequency $f_r$ to allow at least two acquisitions of a vehicle travelling in the video monitoring zone at a given reference speed Vr.

According to yet another characteristic of the invention, the acoustic detection performs the acquisition and processing steps at a sufficient frequency $f_a$ to allow at least two acquisitions of a vehicle travelling in the video monitoring zone at a given reference speed Vr.

According to a characteristic of the invention, the acquisition and processing frequencies will be chosen so as to allow convenient identification of vehicles travelling at high speed, such as for example vehicles travelling at a reference speed of the order of 200 km/h, or even 230 km/hr so as to be able to detect cases of excessive speed that are liable to give rise to accidents under difficult traffic conditions.

According to a characteristic of the invention, and so as to take account of the optionally different processing frequencies related in particular to technological constraints, or to energy-saving imperatives, the processing of the results is performed at a frequency below or equal to the smallest of the three frequencies $f_v$, $f_a$, $f_r$.

According to the invention, each of the types of monitoring can provide an item of binary raw information regarding presence or absence of a vehicle. However, each of the types of monitoring may also provide an enhanced item of information. Thus, according to a characteristic of the invention, the video detection provides at least one item of information regarding the presence of a mobile object in the video monitoring zone and a video confidence index related to the presence information.

According to another characteristic of the invention, the video detection provides information regarding direction and speed of movement of the mobile object.

According to yet another characteristic of the invention, the video detection provides information regarding the dimension of the vehicle. The provision of this type of information makes it possible to ensure both quantitative and qualitative analysis of the traffic, useful for managing the road traffic as well as the network for the maintenance and/or dimensioning thereof.

In the same manner, according to a characteristic of the invention, the sound detection provides an item of information regarding presence of a sound source in the acoustic monitoring zone, and an acoustic confidence index related to the presence information.

According to another characteristic of the invention, the sound detection provides an item of information regarding direction of movement of the sound source.

According to yet another characteristic of the invention, the sound detection provides an item of information regarding power of the sound source.

In the same manner, according to a characteristic of the invention, the radar detection provides an indication of presence of a mobile object in the radar monitoring zone and a radar confidence index related to the presence information.

According to another characteristic of the invention, the radar detection provides a direction and a speed of movement of the mobile object.

According to an additional characteristic of the invention, the radar simultaneously provides a speed of movement of the mobile object and a distance of the mobile object from the radar. This advantageous characteristic of the invention makes it possible to eliminate false detections, especially by comparing the distance provided by the radar detection with the distance between the radar and the radar monitoring zone.

Experience has shown that the information arising from certain types of detection is more reliable than that arising from other types, so, according to a characteristic of the invention, from the step of processing the results of the acquisitions a precedence is given to the information arising from the video and/or radar acquisition.

According to the invention, the step of processing and comparing the information arising from the types of detection implemented may provide binary information such as the presence or absence of a vehicle, and also qualitative and quantitative information. Thus, according to a characteristic of the invention, on completion of the processing step at least one of the following items of information is delivered:
  presence of vehicle,
  speed of vehicle,
  average speed,
  rate of occupancy of the carriageways,
  flow rate of vehicles,
  category or size of the vehicles,
  presence or absence of a vehicle travelling in the wrong direction.

Thus, the method of detection according to the invention may be implemented to ensure various types of monitoring as regards the nature and volume of the traffic and also to detect anomalies. The quantitative information, such as flow rate of vehicles, average speeds and/or rate of occupancy of the carriageways, may be for example calculated by performing temporal summations on the basis of the information pertaining to each vehicle or mobile object tagged by the method according to the invention.

According to a characteristic of the invention, a wrong-direction item of information is delivered in the case of agreement of the information indicating a vehicle travelling in the wrong direction, arising at least from the video and radar acquisitions.

The method according to the invention is aimed chiefly at providing quantitative or qualitative traffic information, that is to say information representing a small volume of digital data particularly adapted for transmission at short duration, or even at low power by RF. However, the method according to the invention may also provide for image recording that may for example, but not exclusively, form the subject of a transmission under predefined circumstances. Thus, according to a characteristic of the invention, the method comprises a step of recording images of the stretch of carriageway according to a sequence corresponding to a given number of the most recent images. By recording images at regular intervals and retaining only the last n images, it is possible to store these images temporarily in the form of digital files requiring only limited storage space and consuming little energy. These images may then, for example, be used only if a predetermined event or incident occurs.

Thus, according to a characteristic of the invention, should a vehicle be present travelling in the wrong direction, the method comprises a step of transmitting the image sequence currently being recorded at the moment of detecting travel in the wrong direction.

According to yet another characteristic of the invention, so as to limit energy consumption, only one of the detections is active continuously and the other detection, or possibly the other detections, are activated only when there is detection of a mobile object or of a vehicle with given movement characteristics, for example wrong direction or speed above a specific threshold.

The invention also relates to a device for detecting vehicles on at least one stretch of a carriageway comprising:

acoustic detection means comprising at least one microphone disposed in such a way as to record the sound originating from at least one zone, termed the acoustic monitoring zone, of the stretch of carriageway and means for processing the sound;

and at least one type of means of detection chosen from:

video detection means comprising a video camera disposed in such a way as to monitor at least one zone, termed the video monitoring zone, of the stretch of carriageway and means for processing video images provided by the video camera;

radar detection means comprising a microwave source emitting towards at least one zone, termed the radar monitoring zone, of the stretch of carriageway, means for receiving the microwave electromagnetic radiation reflected, and means for processing the radiation reflected;

The detection device also comprises a processing unit linked to the detection means and adapted for automatically delivering at least one item of information regarding the presence or absence of at least one vehicle; the processing means and the processing unit being adapted for implementing the method according to the invention.

According to a characteristic of the invention, the detection device comprises RF communication means linked to the processing unit and adapted at least for ensuring the transmission of the information arising from the processing unit.

According to another characteristic of the invention, the RF communication means are adapted for relaying information originating from at least one other detection device.

The implementation of such a detection device provided with RF communication means is particularly adapted to the realization of a network of detection devices disposed along a carriageway. This network is, for example, autonomous and ensures the broadcasting of the information arising from each of the detection devices of the network by repetition up to a network head connected to a command or monitoring post for the carriageway equipped with the network of devices according to the invention. Moreover, this network exhibits the advantage of not requiring any particular cabling for the provision of energy and the transmission of the information arising from each of the devices.

The implementation of a network of devices according to the invention makes it possible, furthermore, to perform a comparison between the information arising from two distinct devices so as to further increase the reliability of detection, especially as regards the identification of incidents, and more particularly travel in the wrong direction. Thus, according to another characteristic of the invention, the RF communication means are adapted for receiving information from another detection device and the processing unit is adapted for processing the information originating from the other detection device.

According to a characteristic of the invention aimed at conferring a certain degree of autonomy on the abovementioned device according to the invention, the detection device comprises at least one electric battery for supplying the device and means for charging this battery.

According to the invention, the charging means may be realized in any appropriate manner and, for example, may comprise a system of wind turbines or else a photovoltaic panel.

The monitoring device according to the invention may be installed at various locations, for example, on a gantry overhanging a road or else on a bridge. According to a characteristic of the invention, the device comprises a mast or pole on which the various constituent elements of the device are fitted height-wise.

According to another characteristic of the invention, so as to limit the energy consumption of the device, the processing unit is adapted for ensuring the continuous operation of just one type of detection means and for triggering the operation of another type or of the other types of detection means only if the continuous-operation detection means detect a mobile object and/or a particular situation such as for example travel in the wrong direction or an excessive speed.

Of course, the various characteristics of the method and/or of the device according to the invention may be associated with one another according to various combinations in so far as they are not mutually incompatible or exclusive.

Additionally, various other characteristics and advantages of the invention will emerge from the description given hereinbelow with reference to the appended drawings which illustrate non-limiting forms of implementation of the method and of embodiment of the device according to the invention.

Figure 1:
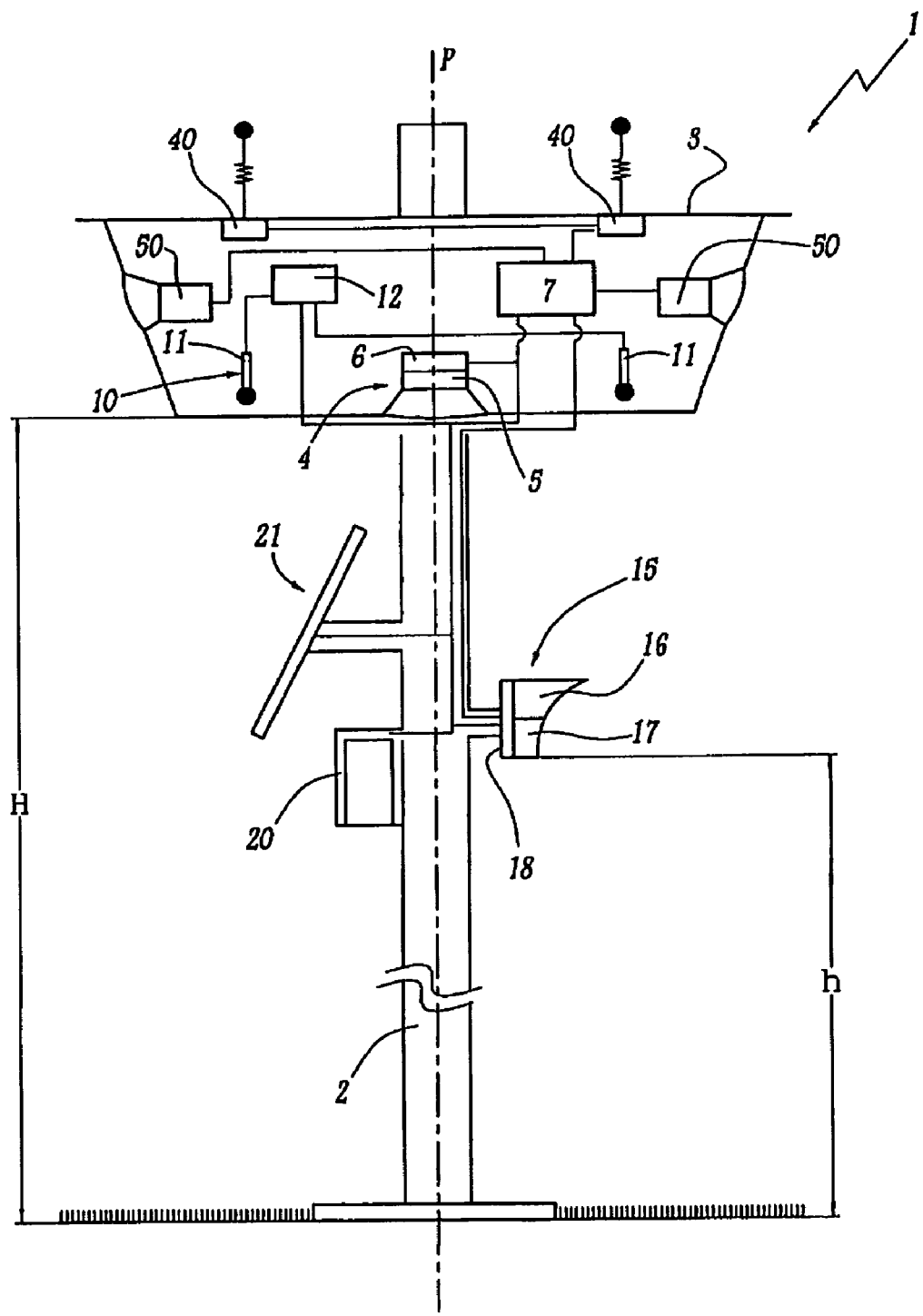
FIG. 1 is a schematic representation of a detection device according to the invention, which is autonomous and fitted to a mast.
Figure 2:
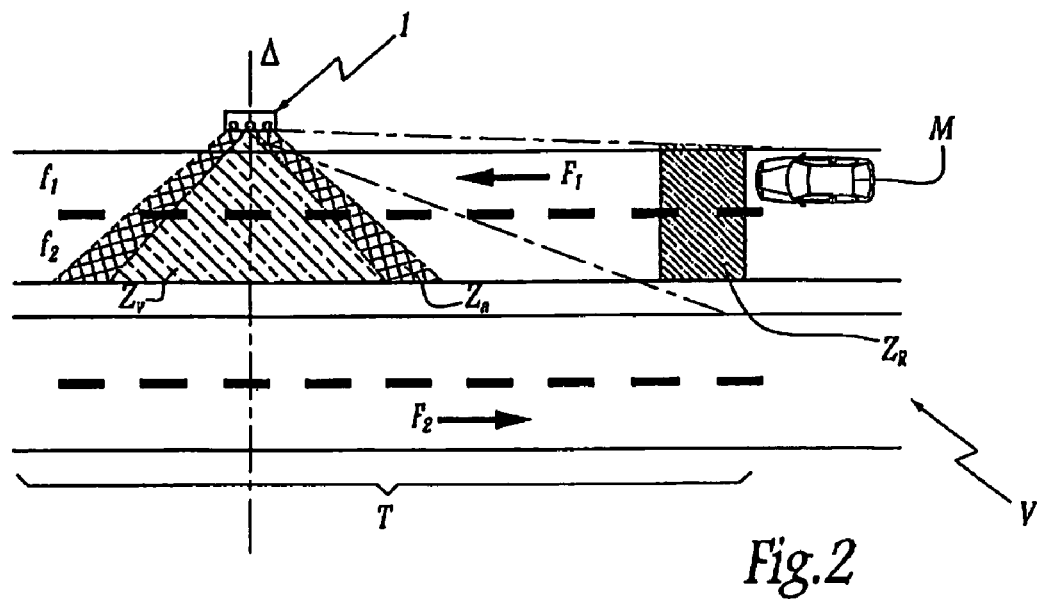
FIG. 2 is a schematic view of a stretch of road carriageway monitored by means of the detection device as illustrated in FIG. 1.
Figure 3:
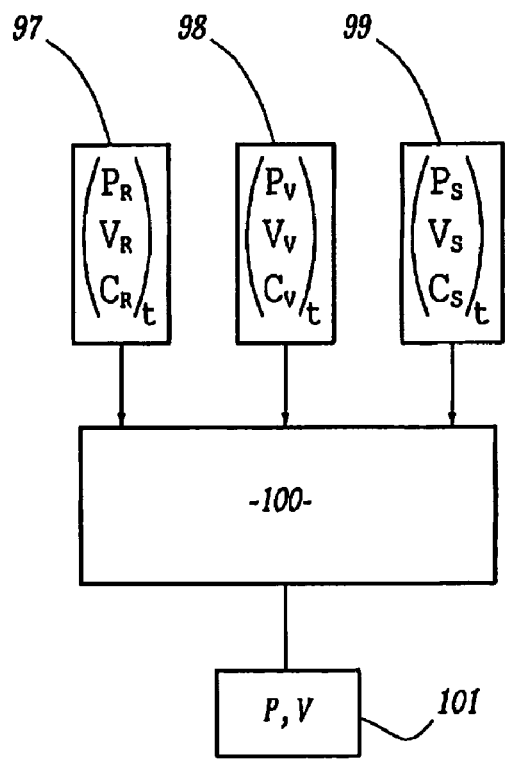
FIG. 3 is a schematic diagram of the method of detection according to the invention.

The detection device according to the invention, such as illustrated schematically in FIG. 1 and designated as a whole by the reference 1, is for example intended to be placed on the verge of a stretch T of a carriageway C, such as shown in FIG. 2.

According to the example illustrated, the detection device 1 comprises a mast 2 which, at a height of several meters, for example of the order of 6 to 12 meters, carries a housing 3 enclosing detection and processing means. According to the example illustrated, the housing 3 accommodates video detection means 4 comprising, on the one hand, a video camera 5 whose optical axis Δ is situated in a plane P perpendicular to the direction of movement of the vehicles on the carriageway V. Thus, the video camera 5 ensures the acquisition of images of a video monitoring zone $Z_V$ of the stretch of carriageway V. The video detection means 4 comprise, on the other hand, means 6 for processing the video images provided by the video camera 5. The image processing means 6 are, furthermore, linked to a processing unit 7 also disposed inside the housing 3.

The detection device 5 also comprises acoustic detection means 10 which comprise at least one and, according to the example illustrated, two microphones 11 disposed on either side of the plane P in such a way as to record the sound of an acoustic monitoring zone $Z_a$. According to the example illustrated, the acoustic monitoring zone possesses the same plane of symmetry P as the video monitoring zone $Z_V$ and covers a slightly greater volume or surface area than that of the video monitoring zone $Z_V$. The microphones 11 are, furthermore, linked to sound processing means 12, possibly being constituted, for example, of an electronic signal processing circuit (DSP "Digital Signal Processor"). The sound processing means 12 are also linked to the processing unit 7.

The detection device furthermore comprises radar detection means 15 composed in particular of a microwave source 16 emitting a microwave radiation towards a radar monitoring zone $Z_r$ distinct from the video $Z_V$ and acoustic $Z_a$ monitoring zones. In order to obtain good decorrelation between the information provided by the radar detection means 15, on the one hand and the video 4 and acoustic 10 detection means, on the other hand, the zones $Z_V$ and $Z_r$ are separated by a distance of a few tens of meters and, for example, of the order of 30 meters. The radar detection means 15 also comprise means 17 for receiving the microwave electromagnetic radiation reflected and means 18 for processing the reflected radiation. According to the example illustrated, the radar detection means 15 are situated outside the housing 3, and are placed at a lower height h than the height H of the housing 3 and, for example, of the order of two to three meters. The processing means 18 are then linked to the processing unit 7 by way of a circuit travelling along the mast 2 inside or outside the latter. In order to facilitate installation of the detection device, the latter is designed, according to the example illustrated, to be autonomous from an energy provision point of view and for this purpose comprises at least one electric battery 20 for supplying all the components of the device 1. The battery 20 is then associated with charging means 21 comprising, according to the example illustrated, a photovoltaic panel.

The monitoring device 1, such as constituted in this way, makes it possible to ensure monitoring of the stretch T of the carriageway V, in accordance with the method according to the invention.

For this purpose, the processing means 6, 12, 18, 7 of the detection device 1 are designed in such a way as to manage all the lanes corresponding to one and the same direction of traffic flow, such as for example indicated by the arrow $F_1$ of FIG. 2, separately and independently of all the lanes corresponding to a normal counterflow direction, such as for example indicated by the arrow $F_2$. This separation of the two directions of flow for the processing is ensured even if the detection means of the device 1 are able to simultaneously cover both directions of flow of the stretch T of the carriageway V. So, the detection method will be described only in relation to the flow on the lanes $f_1$ and $f_2$ having a normal direction of flow from right to left in FIG. 2.

In the case of the radar detection, this selectivity of the monitored zones may in particular be achieved by the processing means 18, which are designed to take account only of echoes arising from the radar monitoring zone $Z_r$ on the basis for example of the flight time of the waves, according to technologies and techniques that are well known to a person skilled in the art. In the same way, the video processing means 6 are adapted for differentiating between the carriageways corresponding to each of the directions of flow, so that the detection means behave like two distinct video detection means, each assigned to a direction of flow. The same behaviour is also implemented for the acoustic processing means.

Thus, faced with the normal operation of the detection device 1, each of the detection means delivers in a regular manner at least one item of information regarding the presence of a vehicle and, preferably, a vehicle presence item of information as well as a confidence index item of information and, as appropriate, a vehicle speed item of information incorporating the direction of movement. A positive speed then corresponds to a normal direction of movement whereas a negative speed of movement will correspond to travel in the wrong direction. Thus, the radar detection means will regularly deliver an item of information regarding the presence of a vehicle $P_r$, a confidence coefficient related to the presence information $C_r$ and a speed information item $V_r$. These items of information 97 are delivered at a frequency $f_r$, such that a vehicle travelling in the radar monitoring zone $Z_r$ at a speed of 200 km/h (60 m/s) will give rise to at least two items of information and, preferably, to five items of information, i.e. in the case of a radar monitoring zone $Z_r$ of 10 m extent, an analysis frequency $f_r$ equal to 30 hertz, the information delivered by the detection means may moreover be associated with a date-stamping item of information indicating the instant of emission of the information. In the same manner, the video detection will emit at a video analysis frequency $f_V$, preferably also equal to 30 hertz, a presence information item $P_V$, a confidence coefficient item $C_V$ and possibly a speed information item. The information items 98 arising from the video detection will also be associated with a date-stamping item of information.

In the same manner, the acoustic detection will provide a presence information item $P_s$, a confidence coefficient information item $C_s$ and possibly a direction of movement or speed information item $V_s$. The sound detection information items 99 will also preferably be emitted at a sound analysis frequency $F_s$, of the order of 30 hertz. The information arising from each of the sound 10, video 4 and radar 15 detection means is processed by the unit 7 within the framework of a processing step 100 on completion of which is delivered at least one item of information 101 such as regarding the presence or absence of a vehicle, preferably associated with a speed information item V. The processing carried out by the unit 7 in accordance with the method of the invention may be performed in various ways, for example it may entail comparing the information of the detections so as to conclude, when two items of information agree, on the presence of a vehicle and thereafter to deliver the speed information item given by the detection having the highest confidence index.

It should be noted that, according to the example illustrated, the monitoring zones being offset, this comparison must involve a time offset for making the comparison. Specifically, within the framework of a vehicle M moving in the normal direction of flow $F_1$, it will firstly give rise to a radar detection, then to acoustic and video detection which will be offset in time. It is then appropriate to perform a temporal correction which will correspond to the journey time of the vehicle M to go from the monitoring zone to the acoustic $Z_a$ and video $Z_V$ monitoring zones determined as a function of the speed $V_r$ detected by the radar detection system. Within the framework of an implementation aimed at simplifying the calculations and reducing the iteration cycles as far as possible so as to reduce the processing-related energy consumption, the comparison may be performed by involving a summation S, after temporal correction, of the presence information $P_r$, $P_V$, $P_s$, each weighted by the corresponding confidence coefficient $C_r$, $C_V$, $C_s$, the presence information P being delivered on completion of the processing step 100 when this sum exceeds a predetermined threshold, chosen in such a way that if just one of the detections provides a presence information item, the threshold cannot be attained. To guarantee a certain degree of flexibility of use, the threshold will for example be chosen also to be attained if only two of the three detections are operating.

Thus, for example, the value of the sum S will be given by the following formula:

$$S = C_p \Sigma P_r + C_V \Sigma P_V + C_s \Sigma P_s$$

where:

$\Sigma P_r$ is the number of radar echoes received for one and the same vehicle;

–$\Sigma P_V$ is the number of images on which this same vehicle is visible;

–$\Sigma P_s$ is the number of temporal sound samples corresponding to this same vehicle.

The radar confidence coefficient $C_r$ may then be calculated from the speed and distance information provided at each echo and possibly weighted by a so-called absolute coefficient, having regard to the general effectiveness of the detection of each of the systems, it being possible for a fixed precedence to be given to the radar and video detections relative to the sound detections. The video confidence coefficient $C_V$ may be calculated from the number of active pixels for a vehicle and possibly be weighted by an absolute confidence coefficient for the video detection. The sound confidence coefficient $C_S$ may for its part correspond to the inverse of the continuous component of the noise possibly weighted by an absolute confidence coefficient.

Thereafter, the optionally delivered presence information item may be supplemented with a speed information item which will be chosen from among the speed given by a detection system exhibiting the highest confidence coefficient, such a confidence coefficient being able, for example, to correspond to a signal noise ratio.

Additionally, it should be noted that in the case of travel in the wrong direction, the vehicle will firstly be detected by the sound and video detection means, and then by the radar detection means, of course, the temporal correction will also be involved in this framework before performing the comparisons or the summations required for delivering the presence information, such as provided on completion of the processing step 100.

Once this item of information is available on completion of step 100, provision may be made to transmit it to a control post (not represented). For this purpose, the device comprises RF communication means 40 linked to the processing unit 7. Such RF communication means may be of any appropriate nature, and for example implement a communication of Wifi, GPRS or other type.

Within the framework of the example illustrated, the communication means 40 are, moreover, adapted for networked operation and also for ensuring the repetition of the information delivered by another detection device identical to that described above. Within the framework of networked operation such as this, it is also possible to envisage a comparison between the information delivered by the various detection devices, this comparison possibly being performed at the level of each of the processing units 7, or else at the level of the control post.

Such a comparison may in particular be especially useful within the framework of the detection of incidents, such as travel in the wrong direction, the redundancy of the comparison and of the detection making it possible to achieve error rates of the order of one in a million which are compatible with the sought-after reliability for triggering alerts involving for example the intervention of police forces.

Within the framework of the detection of incidents of this type, it is also possible to envisage equipping the detection device with auxiliary image acquisition systems 50, such as for example video cameras which ensure regular recording of images which are stored temporarily, for example for a duration of several minutes, such as between 1 and 10 nm, so as to generate a kind of recording loop. The images of the recording loop will then be transmitted to the control post only in case of particular events, such as for example detecting travel in the wrong direction, or else at the request of the control post.

Of course, various modifications may be afforded to the detection device and to the method according to the invention, within the framework of the claims.

Thus, according to the example illustrated, the processing means 6, 12, 18 are distinct and constituted by separate units, however they could also be integrated in the processing unit 7, or else be integrated into one or two distinct units.

In the same way, according to the example illustrated, the radar detection means are placed so as to be the first ones to detect a vehicle travelling in a normal direction. However, the radar detection means could be placed so as to detect a vehicle in the normal direction after the video and/or sound detection means. In such a configuration, the radar detection means will detect a vehicle travelling in the wrong direction before the video and sound detection means.

The invention claimed is:

1. A method of detecting vehicles on at least one stretch of a carriageway implementing:
   an acoustic detection comprising a step of acquiring and processing the sound originating from at least one zone, termed the acoustic monitoring zone, of the stretch of carriageway;

and at least one detection chosen from:
   a video detection comprising a step of acquiring and processing the video images of at least one zone, termed the video monitoring zone, of the stretch of carriageway;
   a radar detection comprising a step of emitting a microwave electromagnetic radiation towards at least one zone, termed the radar monitoring zone, of the stretch of carriageway and a step of acquiring and processing the microwave electromagnetic radiation reflected;

and comprising processing the results of the acoustic detection and at least one of the video and radar detections so as to deliver an item of information regarding the presence or absence of at least one vehicle;
   wherein each detection performs the acquisition and processing steps at a sufficient frequency to allow at least two acquisitions of a vehicle travelling in the monitoring zone at a given reference speed.

2. The method of detection according to claim 1, implementing the three types of detection and in that the step of processing the results comprises a comparison of the results so as to conclude on the presence or absence of the vehicle in the case of agreement of the results of at least two of the three types of detection.

3. The method of detection according to claim 1, wherein the step of processing the results concludes on the presence of the vehicle in the case of agreement of the results of the three types of detection.

4. The method of detection according to claim 1, wherein at least one of the monitoring zones is distinct from at least one other monitoring zone.

5. The method according to claim 1, wherein the processing of the results is performed at a frequency below or equal to the smallest of the acquisition frequencies.

6. The method of detection according to claim 1, characterized in that on completion of the processing step at least one of the following items of information is delivered:
- presence of vehicle;
- speed of vehicle;
- average speed;
- rate of occupancy of the carriageways;
- flow rate of vehicles;
- category or size of the vehicles;
- presence of a vehicle travelling in the wrong direction.

7. A method of detecting vehicles on at least one stretch of a carriageway implementing:
- an acoustic detection comprising a step of acquiring and processing the sound originating from at least one zone, termed the acoustic monitoring zone, of the stretch of carriageway;

and at least one detection chosen from:
- a video detection comprising a step of acquiring and processing the video images of at least one zone, termed the video monitoring zone, of the stretch of carriageway;
- a radar detection comprising a step of emitting a microwave electromagnetic radiation towards at least one zone, termed the radar monitoring zone, of the stretch of carriageway and a step of acquiring and processing the microwave electromagnetic radiation reflected;

and comprising processing the results of the acoustic detection and at least one of the video and radar detections so as to deliver an item of information regarding the presence or absence of at least one vehicle;
wherein each detection provides at least one item of information regarding the presence of a mobile object in the monitoring zone and a confidence index related to the presence information.

8. The method of detection according to claim 7, implementing the three types of detection and in that the step of processing the results comprises a comparison of the results so as to conclude on the presence or absence of the vehicle in the case of agreement of the results of at least two of the three types of detection.

9. The method of detection according to claim 7, wherein the step of processing the results concludes on the presence of the vehicle in the case of agreement of the results of the three types of detection.

10. The method of detection according to claim 7, wherein at least one of the monitoring zones is distinct from at least one other monitoring zone.

11. The method according to claim 7, wherein each detection provides information regarding direction and/or speed of movement of the mobile object.

12. The method according to claim 7, wherein at least one detection provides information regarding the dimension of the mobile object.

13. The method of detection according to claim 7, characterized in that on completion of the processing step at least one of the following items of information is delivered:
- presence of vehicle;
- speed of vehicle;
- average speed;
- rate of occupancy of the carriageways;
- flow rate of vehicles;
- category or size of the vehicles;
- presence of a vehicle travelling in the wrong direction.

14. A method of detecting vehicles on at least one stretch of a carriageway implementing:
- an acoustic detection comprising a step of acquiring and processing the sound originating from at least one zone, termed the acoustic monitoring zone, of the stretch of carriageway;

and at least one detection chosen from:
- a video detection comprising a step of acquiring and processing the video images of at least one zone, termed the video monitoring zone, of the stretch of carriageway;
- a radar detection comprising a step of emitting a microwave electromagnetic radiation towards at least one zone, termed the radar monitoring zone, of the stretch of carriageway and a step of acquiring and processing the microwave electromagnetic radiation reflected;

and comprising processing the results of the acoustic detection and at least one of the video and radar detections so as to deliver an item of information regarding the presence or absence of at least one vehicle;
wherein the comparison between the result of one of the detections with the result of another detection is performed on the basis of a time offset determined as a function of the speed, optionally of the direction of the movement of the vehicle and of the distance between the monitoring zones for the detections whose results are compared.

15. The method of detection according to claim 14, implementing the three types of detection and in that the step of processing the results comprises a comparison of the results so as to conclude on the presence or absence of the vehicle in the case of agreement of the results of at least two of the three types of detection.

16. The method of detection according to claim 14, wherein the step of processing the results concludes on the presence of the vehicle in the case of agreement of the results of the three types of detection.

17. The method of detection according to claim 14, wherein at least one of the monitoring zones is distinct from at least one other monitoring zone.

18. The method of detection according to claim 14, characterized in that on completion of the processing step at least one of the following items of information is delivered:
- presence of vehicle;
- speed of vehicle;
- average speed;
- rate of occupancy of the carriageways;
- flow rate of vehicles;
- category or size of the vehicles;
- presence of a vehicle travelling in the wrong direction.

19. A device for detecting vehicles on at least one stretch of a carriageway comprising:
- acoustic detection means comprising at least one microphone disposed in such a way as to record the sound originating from at least one zone, termed the acoustic monitoring zone, of the stretch of the carriageway and means for processing the sound;

and at least one type of means of detection chosen from:
- video detection means comprising a video camera disposed in such a way as to monitor at least one zone, termed the video monitoring zone, of the stretch of the carriageway and means for processing video images provided by the video camera;
- radar detection means comprising a microwave source emitting towards at least one zone, termed the radar monitoring zone, of the stretch of the carriageway, means for receiving the microwave electromagnetic radiation reflected, and means for processing the radiation reflected;

as well as a processing unit linked to the acoustic detection means and at least one of the video and radar detection means and adapted for delivering at least one item of information regarding the presence or absence of at least one vehicle;

wherein, on the one hand, the detection means are adapted to acquire the sound and at least one of the video images and radiation reflected and, on the other hand, the processing means and processing unit are adapted for processing the results of the acoustic detection and at least one of the video and radar detections, at a sufficient frequency to allow at least two acquisitions of a vehicle travelling in the monitoring zone at a given reference speed.

20. The detection device according to claim 19, further comprising RF communication means linked to the processing unit and adapted at least for ensuring the transmission of the information arising from the processing unit and for relaying information originating from at least one other detection device.

21. The detection device according to claim 19, further comprising at least one electric battery for supplying the device and means for charging this battery comprising at least one photovoltaic panel.

22. The detection device according to claim 19, further comprising a mast or pole on which the various constituent elements of the device are fitted height-wise.

23. A device for detecting vehicles on at least one stretch of a carriageway comprising:
  acoustic detection means comprising at least one microphone disposed in such a way as to record the sound originating from at least one zone, termed the acoustic monitoring zone, of the stretch of the carriageway and means for processing the sound;

and at least one type of means of detection chosen from:
  video detection means comprising a video camera disposed in such a way as to monitor at least one zone, termed the video monitoring zone, of the stretch of the carriageway and means for processing video images provided by the video camera;
  radar detection means comprising a microwave source emitting towards at least one zone, termed the radar monitoring zone, of the stretch of the carriageway, means for receiving the microwave electromagnetic radiation reflected, and means for processing the radiation reflected;

as well as a processing unit linked to the acoustic detection means and at least one of the video and radar detection means and adapted for delivering at least one item of information regarding the presence or absence of at least one vehicle and a confidence index related to the presence information.

24. The detection device according to claim 23, further comprising RF communication means linked to the processing unit and adapted at least for ensuring the transmission of the information arising from the processing unit and for relaying information originating from at least one other detection device.

25. The detection device according to claim 23, further comprising at least one electric battery for supplying the device and means for charging this battery comprising at least one photovoltaic panel.

26. The detection device according to claim 23, further comprising a mast or pole on which the various constituent elements of the device are fitted height-wise.

27. A device for detecting vehicles on at least one stretch of a carriageway comprising:
  acoustic detection means comprising at least one microphone disposed in such a way as to record the sound originating from at least one zone, termed the acoustic monitoring zone, of the stretch of the carriageway and means for processing the sound;

and at least one type of means of detection chosen from:
  video detection means comprising a video camera disposed in such a way as to monitor at least one zone, termed the video monitoring zone, of the stretch of the carriageway and means for processing video images provided by the video camera;
  radar detection means comprising a microwave source emitting towards at least one zone, termed the radar monitoring zone, of the stretch of the carriageway, means for receiving the microwave electromagnetic radiation reflected, and means for processing the radiation reflected;

as well as a processing unit linked to the acoustic detection means and at least one of the video and radar detection means and adapted for delivering at least one item of information regarding the presence or absence of at least one vehicle;

wherein the processing unit is also adapted to compare the result of one of the detections with the result of another detection on the basis of a time offset determined as a function of the speed, optionally of the direction of the movement of the vehicle and of the distance between the monitoring zones for the detections whose results are compared.

28. The detection device according to claim 27, further comprising RF communication means linked to the processing unit and adapted at least for ensuring the transmission of the information arising from the processing unit and for relaying information originating from at least one other detection device.

29. The detection device according to claim 27, further comprising at least one electric battery for supplying the device and means for charging this battery comprising at least one photovoltaic panel.

30. The detection device according to claim 27, further comprising a mast or pole on which the various constituent elements of the device are fitted height-wise.

* * * * *